Jan. 12, 1932.　　　　F. H. SCHAVOIR　　　　1,841,062
GOLF CLUB HEAD AND PROCESS OF MAKING THE SAME
Filed Aug. 15, 1928
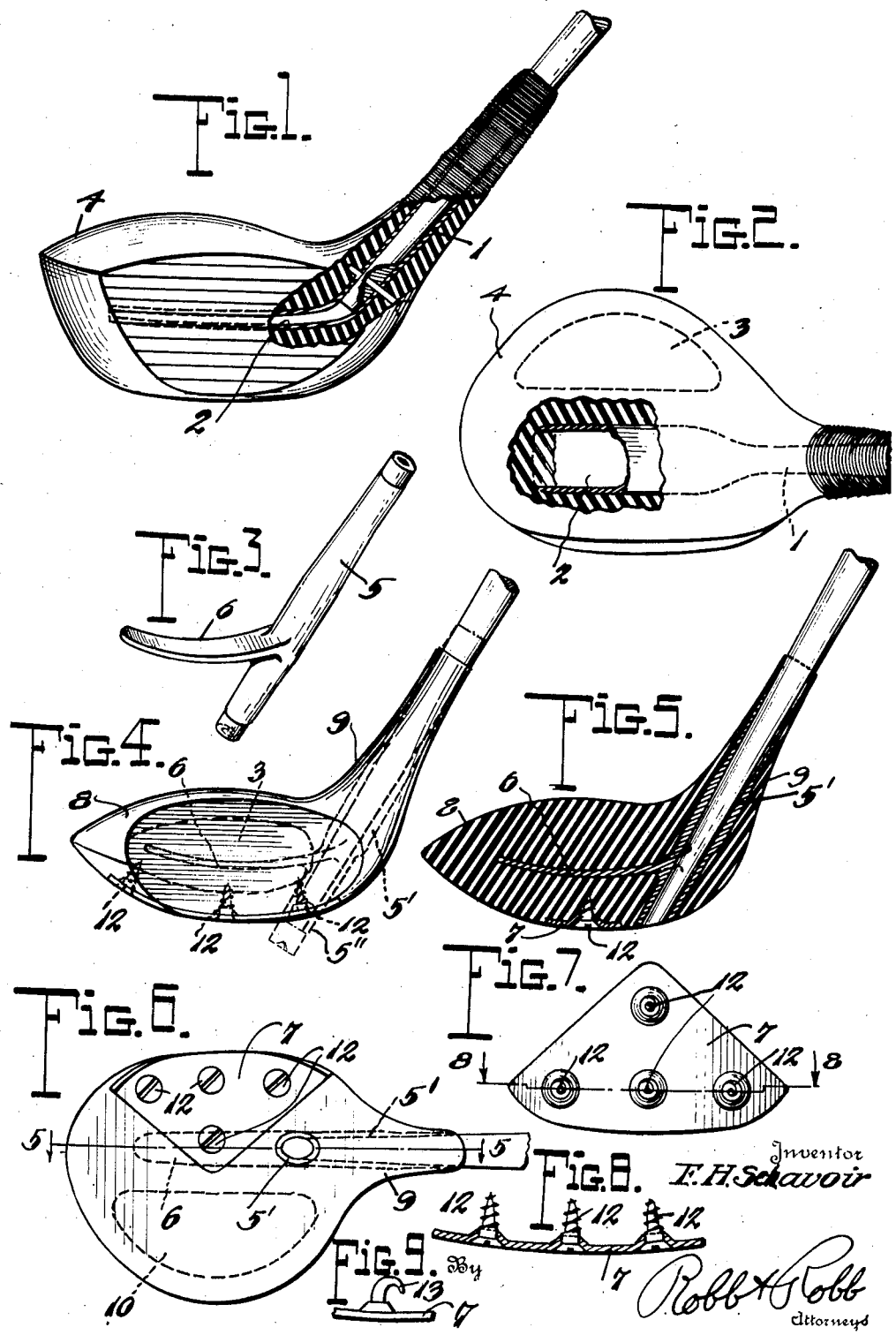

Patented Jan. 12, 1932

1,841,062

UNITED STATES PATENT OFFICE

FREDERICK H. SCHAVOIR, OF STAMFORD, CONNECTICUT, ASSIGNOR TO SCHAVOLITE GOLF CORPORATION, OF NEW YORK, N. Y.

GOLF CLUB HEAD AND PROCESS OF MAKING THE SAME

Application filed August 15, 1928. Serial No. 299,766.

This invention relates to improvements in the art of producing golf clubs and to the product thereof including such instruments as drivers, brassies, and spoons.

The object in view is the obtaining of a uniform product possessing the requisite balance, durability, and efficacy.

In the obtaining of this object and the carrying out of the art, I utilize the art set forth in my copending application filed March 6, 1928, Serial No. 259,556 of which this is a continuation in part.

Included in the steps comprehending the present improved process or art is the molding of plastic material to the requisite contour for forming a golf club head in a manner to provide a cavity sealed from exterior communication and a bushing or sleeve effectively anchored in the head and arranged to receive the club shank.

In greater detail the process includes the employment of a solid bar, embedding the same in the plastic mass, and, after vulcanization of the mass to the requisite hardness, drilling the bar to produce the handle receiving bushing.

The process includes other details as will hereinafter become apparent and be subsequently pointed out in the appended claims, and also comprises a product involving a golf club head having effectively anchored therein a bushing given its final shape as a sleeve subsequent to the formation of the head.

That phase of the invention relating to the product of the present improved process also comprises certain other novel constructions, combination, and arrangements of parts as subsequently specified and claimed.

In the accompanying drawings:

Figure 1 is a sectional elevation of the head of the golf club involving an embodiment of the present invention.

Figure 2 is a sectional plane thereof.

Figure 3 is a perspective view of the bushing-forming rod and its prong detached.

Figure 4 is a view of the side elevation of the preferred embodiment of the finished product.

Figure 5 is a vertical sectional view taken on the plane indicated by line 5—5 of Figure 6.

Figure 6 is an inverted plan view thereof.

Figure 7 is a plan view of the wear plate detached with the anchoring screws applied.

Figure 8 is a vertical sectional elevation taken on the planes indicated by lines 8—8 of Figure 7.

Figure 9 is a fragmentary edge view of the wear plate with a modified embodiment of its anchorage means.

In the carrying out of the process to produce the embodiment seen in Figures 1 and 2, a two-part or dual sectional mold is employed and a plastic compound of rubber is introduced into each of the two sections of the mold. A bushing 1 is then inserted having a flattened terminal projection 2, the terminal projection being forced edgewise into the plastic material at the open face of one of the molds while the bushing 1 is pressed into place in a portion of the plastic material along the shank portion of the mold section. A recess forming instrument is then inserted in the plastic material of the other section to produce a depression or hollow space such as indicated at 3 in the plastic material in the second mold section. This recess, of course, may be formed by any appropriate instrumentality and is filled with blowing gas such as air or ammonia and then the two sections of the mold are brought together and bolted or otherwise securely locked in engagement while held together preferably under the pressure of an appropriate air press. The mold is then introduced into a heated press and subjected to vulcanizing temperature for a period of one hour and fifteen minutes for vulcanizing the plastic compound to the requisite hardness. During the period of vulcanization the air or other gas trapped in the area 3 expands and presses the plastic material tightly against the surrounding walls of the mold section and retains it in such position during the balance of the vulcanization. The plastic material thus assumes the contour of the finished head 4. When the curing period has been completed the mold is removed from the press and plunged in cold water. The chilling action thus resulting reduces the temperature of the imprisoned air and thus relieves the expanding stress thereof and hence avoids danger of cracking or other injurious action from internal pressure.

In Figure 3 there is illustrated a rod 5 which is formed of solid material and preferably bulged midway of its length to be somewhat barrel shaped in general contour and provided with a laterally outstanding prong 6 adapted to take the place of the terminal section 2. In the production of the structure seen in Figures 4–6 inclusive, the bar 5 is employed in lieu of a bushing or sleeve and the process carried out is otherwise substantially the same as that above set forth except for the application of a wear plate 7 and the subsequent treatment of the bar 5. In thus carrying out the process, the wear plate 7 is first inserted into the mold with the anchoring screws or other anchorage means 12 located in place as seen in Figure 8, the plastic material is introduced into the mold sections on top of plate 7 and surrounding screws 12 substantially as above set forth to form the club head 8 and shank 9, one of the sections being provided with the recess or hollow area 10 corresponding to the area 3. When the sections of the mold have been thus supplied with plastic compound the rod 5 is placed in the core rests of the mold so that when the two parts of the mold are brought together the plastic material forming the shank 9 and a part of the head 8 will be brought together about and cause to conform to the contour of the exterior surface of the rod 5. The mold is then closed and bolted while being held together preferably by a small air press. After bolting, the mold is removed and placed in a larger heated press where it is subjected to the vulcanizing temperature as above set forth and after the time limit of exposure to heat above stated, the mold is removed and chilled as by submerging cold water. The mold is then opened, the club head removed, and further treated for reducing the rod 5 to the form from a sleeve for receiving the handle of the club.

For instance, after the removal of the club head from the mold, a drill is passed longitudinally through the rod 5 coaxial therewith to reduce the same to tubular form seen in 5' of the drawings.

As the lower end portion of the rod 5 rests in the lower core rest of the mold, such end portion projects beyond the head 8 when the latter is removed from the mold and leaves the extension seen in dotted lines in 5" in Figure 4. This extension is cut away and smoothed off to be continuous of the under surface of the head and this cutting operation may be carried out either before or after drilling of the rod 5.

It is, of course, possible to employ various forms of anchorage means for the wear plate 7 other than the screws 12, and in Figure 9 there is seen a hooked pin 13 inserted through plate 7 in lieu of the screws 12.

What I claim is:

1. As a new article of manufacture, a molded club head having the portion at one side of its axial center constituting the striking side solid, a hollow chamber at the other side of said center, whereby to concentrate the weight of the head on said striking side, and a metal bushing extending substantially throughout the striking side.

2. As a new article of manufacture, a club head of vulcanized rubber having formed therein at one side an interior chamber constituting a gas receiving cavity to receive the gases formed during vulcanization and a dead air space after vulcanization.

3. As a new article of manufacture, a substantially hard rubber composition club head, comprising a solid body at one side provided with a striking face and formed with an internal cavity distantly related to the striking face to reduce the weight at the side opposite the striking face.

4. As a new article of manufacture, a molded club head comprising a solid body at that side constituting the striking side, said body being hollow at its opposite side, and a flattened shaft receiving member extending substantially centrally of the solid side.

5. As a new article of manufacture, a club head of molded relatively hard vulcanized rubber solid at one side and hollow at the opposite side, and a hollow shaft receiving bushing having a flattened prong extending into the solid side of the head.

6. As a new article of manufacture, a club head of molded relatively hard vulcanized rubber terminating at one end in a neck and formed with a striking face at one side, said head being solid at the striking face side to substantially a median line, and hollow at the opposite side of said line, and a shaft bushing disposed centrally of the neck and having an extension projecting throughout the major portion of the solid side aforesaid.

7. A club head comprising a body, a bushing extending entirely through the head, and a prong projecting laterally from the bushing and extending longitudinally of the body for substantially the major portion thereof said prong being formed to resist torsional movement of the body around said prong.

8. A club head comprising a body of rigid vulcanized rubber material, a handle receiving bushing extending through the body, and an integral flattened prong extending laterally from the bushing within the body to stabilize the anchorage between the body and bushing.

9. A club head comprising a body of substantially hard and rigid rubber material, a wear plate engaging said body, and a flattened handle anchoring projection extending into the body in spaced relation to the plate and bonded in the body mass.

In testimony whereof I affix my signature.

FREDERICK H. SCHAVOIR.